Patented Mar. 10, 1942

2,275,586

UNITED STATES PATENT OFFICE 2,275,586

TRI (HYDROXY METHYL) ACETALDEHYDE AND A PROCESS OF MAKING IT

Wilhelm Fitzky, Frankfort-on-the-Main, Germany, assignor, by mesne assignments, to General Aniline & Film Corporation, New York, N. Y., a corporation of Delaware No Drawing. Application March 22, 1939, Serial No. 263,408. In Germany March 25, 1938

4 Claims. (Cl. 260—602)

The present invention relates to tri (hydroxy methyl) acetaldehyde and to a process of preparing it.

I have found that saturated aliphatic aldehydes containing at least two —CH₂OH groups at the carbon atom adjacent to the aldehyde group may be produced by causing one mol of a saturated aliphatic aldehyde containing at least two hydrogen atoms at the carbon atom adjacent to the aldehyde group to act upon an aqueous solution of at least about two mols of formaldehyde in the presence of a weakly alkaline substance.

Thus the trihydroxy-methyl compound of the acetaldehyde is obtained in the presence of small quantities of weakly alkaline substances in nearly pure condition and with a good yield from 3 mols of formaldehyde with 1 mol of acetaldehyde without a substantial consumption of alkali, that is without the formation of acids.

$$3CH_2O + CH_3-CHO \rightarrow (CH_2OH)_3 \equiv C-CHO$$

The triacetaldehyde is a limpid highly viscous liquid which may be transformed into a polyacetyl compound capable of being distilled.

Similarly to acetaldehyde, the derivatives thereof may be transformed in the manner described above into the corresponding methylol compounds, for instance acetaldol, furthermore propionic aldehyde and butyric aldehyde which yield with formaldehyde the following dihydroxymethyl compounds:

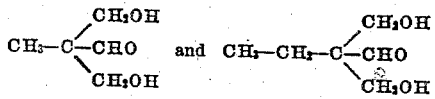

These products, too, are limpid, highly viscous liquids miscible with water.

The formaldehyde is applied in an aqueous solution of any concentration whatever of, for instance, 10 per cent, 30 per cent or 40 per cent. The temperatures applied may be between room temperature and a maximum of about 80° C. As weakly alkaline condensing agents there may preferably be used: alkali metal carbonates, such as sodium carbonate, potassium carbonate, lithium carbonate and ammonium carbonate; furthermore sodium sulfite. The quantities are preferably chosen in such a manner that the reaction mixture is just weakly alkaline at the end of the reaction care being taken that during the reaction small amounts of the alkaline substance are consumed by means of by-reactions. In general there must be employed about 3 per cent to about 10 per cent of the alkaline substance calculated upon the weight of the saturated aliphatic aldehyde used containing hydrogen atoms at the carbon atom adjacent to the aldehyde group.

The new polyhydroxy-aldehydes are very reactive compounds which can be used for many reactions. They are valuable intermediate products to be used particularly in the industry of plastic masses and as adjuvants in the textile industry.

The following examples serve to illustrate the invention, but they are not intended to limit it thereto:

(1) 1200 grams of a formaldehyde solution of 30 per cent strength are mixed with 200 grams of acetaldehyde and after the addition of 10 grams of sodium carbonate the mixture is heated for 24 hours to about 40° C. to 50° C. After the addition of further 5 grams of sodium carbonate heating is continued for further 24 hours until the condensation is complete. The whole is then neutralized with a small quantity of dilute sulfuric acid and the water is entirely distilled under reduced pressure. In order to eliminate the small quantity of salts the viscous residue is dissolved in acetone, the solution is filtered and the solvent is distilled. The last traces are removed under reduced pressure at about 140° C.

500 grams of trimethylol acetaldehyde are obtained in the form of a limpid highly viscous liquid being miscible with water.

Analysis—
Found: 45.2% C, 7.5% H
Calculated C₅H₁₀O₄=44.8% C, 7.5% H

By heating the trimethylol acetaldehyde with 4 times the quantity of acetic anhydride there is obtained a tetracetyl compound boiling at 165° C. under a pressure of 6 mm. When mixed with water this compound is transformed into the triacetylated trihydroxyaldehyde and acetic acid.

Analysis of the tetracetyl compound—
Found: saponification number 705 10.2% CHO
Calculated: C₁₃H₂₀O₉ saponification number 700 9.1% CHO (2) The batch used in Example 1 is condensed with 15 grams of potassium carbonate instead of 15 grams of sodium carbonate. The result is the same as in Example 1.

(3) 1200 grams of formaldehyde solution of 30 per cent strength are mixed with 400 grams of acetaldol and after the addition of 20 grams of sodium carbonate the mixture is heated for 36 hours to about 40° C. to 50° C. The condensation is then complete. The whole is worked up as described in Example 1. There are obtained 700 grams of the polymethylol compound of the following formula:

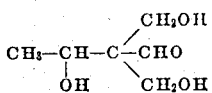

which has a feebly yellowish highly viscous consistency.

I claim:

1. The tri-hydroxymethyl-acetaldehyde of the following formula: $(HO.H_2C)_3 \equiv C-CHO$, said compound being a limpid viscous liquid miscible with water.

2. The process which comprises causing one mol of acetaldehyde to act upon an aqueous solution of about three mols of formaldehyde in the presence of a weakly alkaline substance of the group consisting of alkali metal carbonates and ammonium carbonate.

3. The process which comprises causing one mol of acetaldehyde to act upon an aqueous solution of about three mols of formaldehyde at a temperature between room temperature and about 80° C. and in the presence of a weakly alkaline substance of the group consisting of alkali metal carbonates and ammonium carbonate.

4. The process which comprises causing one mol of acetaldehyde to act upon an aqueous solution of about three mols of formaldehyde at a temperature of about 40° C. to 50° C. and in the presence of sodium carbonate.

WILHELM FITZKY.